United States Patent [19]

Harwit

[11] 3,720,469
[45] March 13, 1973

[54] SPECTROMETRIC IMAGER
[75] Inventor: Martin Harwit, Ithaca, N.Y.
[73] Assignee: Spectral Imaging Inc., Concord, Mass.
[22] Filed: Jan. 25, 1971
[21] Appl. No.: 109,432

[52] U.S. Cl..................356/74, 250/237 R, 356/98
[51] Int. Cl..................................................G01j 3/02
[58] Field of Search.......250/237 R, 237 G; 356/74, 76-79, 356/96-98

[56] References Cited

UNITED STATES PATENTS 3,578,980   5/1971   Decker et al. .......................... 250/237

OTHER PUBLICATIONS

Sloane et al. "Codes for Multiplex Spectrometry," Applied Optics, Vol. 8, No. 10, October 1969.

Harwit et al. "Doubly Multiplexed Dispersive Spectrometers," Applied Optics, Vol. 9, No. 5, May 1970.

Primary Examiner—William L. Sikes
Assistant Examiner—F. L. Evans
Attorney—John Noel Williams

[57] ABSTRACT

An optical device modulates radiation such as light from an extended object and focuses it onto a single detector in such a way that the modulation gives both spatial resolution of different points on the object and spectral resolution of light coming from each point on the object. The signal received by the detector can then be demodulated to reconstruct both the spatial and spectral properties of the initial extended object. A mask pattern is used, which can be variably exposed in successive steps to produce a cyclic encoding pattern in two dimensions. For an image resolved into $p \times m$ elements, the mask need only have $[2p-1][2m-1]$ elements, instead of $p^2 \times m^2$ modulating elements.

13 Claims, 7 Drawing Figures

PATENTED MAR 13 1973 3,720,469
SHEET 1 OF 2
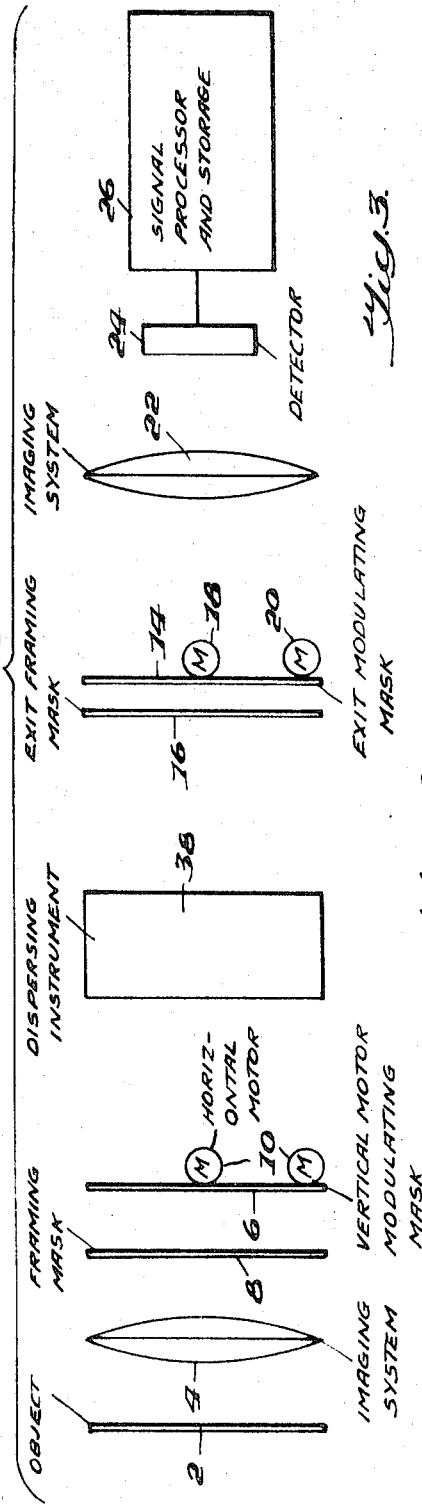
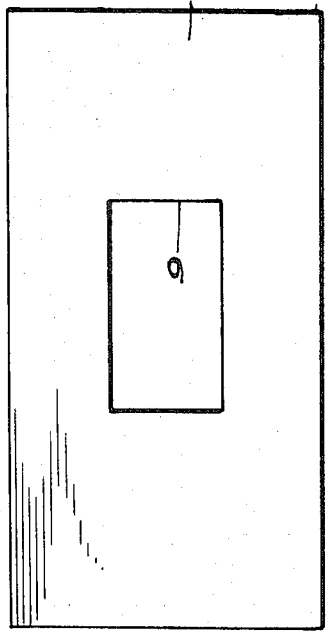
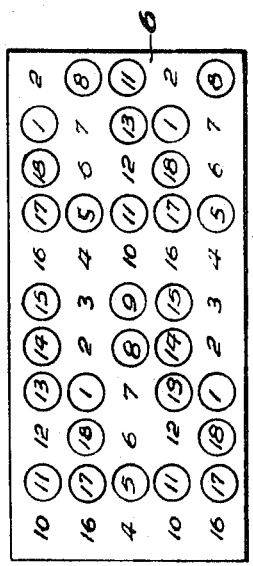
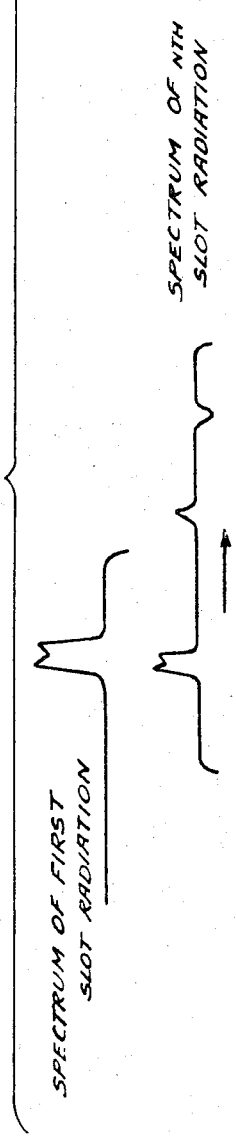

SPECTROMETRIC IMAGER

BACKGROUND OF THE INVENTION

1. Field of the Invention

The invention relates to a device for modulating radiation from an extended object and focuses it on a single detector in such a way as to give both spatial and spectral solution of the object.

2. The Prior Art

Over the past few years, a number of schemes have been described which use selective modulation of light from an object, to convey information either about the spatial distribution of light coming from the object, or about the spectral distribution of this light.

In the spatial modulator instruments described by Gottlieb, IEEE-Transactions on Information Theory, 14, 428, 1968 and Decker Applied Optics, 9, 1392, 1970, light from the object is first focused onto a mask, which alternately transmits light at any given point, or blocks it. The sequence in which light is passed or blocked differs for each point of this focused image. Light transmitted by the mask then passes onto the detector and the intensity of the radiation is recorded, at each position of the mask. If the object is to be resolved into $m \times n$ image elements, there must be mn intensity levels, measured at the detector, one level corresponding to each different mask configuration.

In the purely spectral modulators described by Ibbett, Aspinall and Grainger, Applied Optics, 7, 1089, 1969 and by Decker and Harwit, Applied Optics, 7, 2205, November 1968, light enters a single entrance slit of a grating dispersion spectrometer, and is modulated at n different exit slot positions in the exit focal plane of the instrument. Each of the n different spectral elements is modulated in a different fashion, by a mask or some other device that transmits or blocks the radiation. Transmitted radiation again is gathered onto a single detector and the intensity levels recorded or transmitted to a demodulator. The demodulator then recovers the intensity of light incident on each of the n spectrometer exit slot-positions and thus yields the spectrum of the light source.

An instrument with greater capability can accept a larger amount of light, entering a spectrometer through a number of entrance slot positions, and leaving the spectrometer again through a number of exit slot positions. In such an instrument both the entrance and exit apertures have modulators associated with them. Instruments of this kind have been discussed by Golay J. Opt. Soc. Amer., 39, 437, 1949, who analyzed for one color at a time. Mertz, Transformations in Optics, (John Wiley and Sons, 1965) in his Mock Interferometer; Harwit, in Astron. Journ., 71, Nov. 6, 1966 and Harwit, Phillips, Fine and Sloane, Applied Optics, 9, 1149, May, 1970, Doubly Multiplexed Dispersive Spectrometers, analyze for a larger number of colors, n at one time. In such instruments, light enters the instruments through m entrance slots and exits through n exit slots. If the light imaged onto the entrance of the spectrometer is not uniform in intensity, it is then necessary to make $m \times n$ measurements with m entrance mask positions and n exit mask positions, in order to recover the spectrum of light entering at each individual slit position of the spectrometer. In actual practice, the light entering, normally can be made homogeneous, and then a reduced number of measurements suffices to give the spectrum of the integrated light incident on the spectro-meter.

From what has been said, it is clear that the spectrometer, modulated both at the entrance and exit, has some limited imaging capability; specifically, it is a one dimensional spectral imaging device when operated in the $m \times n$ mode.

SUMMARY OF THE INVENTION

What has not been heretofore provided is a fully two-dimensional spectral imaging device, using only one detector, and it is the purpose of the invention to be described to provide such a mechanism.

Somewhat like Gottlieb, 1968, one can consider the entrance and exit regions of a spectrometer, having large extent both in width and in height, to be divided into a number of strips, one can then label points on each of these strips by successive numbers, treating the two dimensional intensity distribution over the surface, as though it were an intensity distribution on a single, longer, one-dimensional strip.

The entrance or exit area of the spectrometer is then subdivided into strips which can be labeled, so that the entire area of $m \times n$ spatial resolution elements can be considered equivalent to a single strip of length $m \times n$ elements.

If this procedure is made use of in the instrument described by Harwit, Phillips, Fine and Sloane, Applied Optics, 9, 1149, May 1970, one is able, basically, to subdivide each entrance slot height into different regions whose spectral intensities can be analyzed separately. In essence the HPFS instrument described above simply determines through which of n exit positions light is reaching the detector, what these n intensities are, for a given entrance mask position and, in fact, what the respective intensities are, in turn, when p different entrance mask positions are used. In the new procedures to be described here, use is made of $m \times p$ entrance mask positions corresponding to an entrance image of m units high and p units long, with an exit mask m units high and n units long, meaning that spectral information about an image is obtained, with the following information content after demodulation. For each of $m \times p$ areal elements located on and describing the image surface, there will be a spectrum consisting of n spectral resolution elements. Because of the nature of the device, these n elements do not entirely overlap in wave length, but the overlap can be made complete through any given spectral range, by suitable choice of n.

If $p \times m$ entrance masks with $p \times m$ elements, and similarly $n \times m$ exit masks with $n \times m$ elements had to be constructed, the expense would be formidable. That this problem exists, even for the simplest multiplexed spectrometers, was realized by Decker and Harwith (1968) supra and stimulated Sloane, Fine, Phillips and Harwit, Applied Optics, 8, 2103, 1969 to suggest the use of cyclic codes, in which an $n \times n$ mask could be replaced by a single strip having $2n - 1$ open or closed positions, instead of $n^2$. When n is of the order of $10^3$, it is clear that a considerable saving in expense can be achieved in this fashion. In actual use, the strip type of mask is moved along its length, one step at a time, giving an entirely new set of n mask positions, for modulation purposes, in each of the n available settings. The cyclic codes to be used for this have to be specially chosen for proper demodulation characteristics. This was already discussed in the initial article by Sloane, Fine, Phillips and Harwit, 1969, and further elaborated on, for the multi-entrance-multi-exit instrument, by Harwit, Phillips, Fine and Sloane, (1970) supra.

In the particular device under consideration now, where a two-dimensional, rather than a one-dimensional cyclic pattern would be needed to cut expenses, the following mask design can be used. The mask consists, not of $p^2 \times m^2$ elements, to produce an overall mask with $p \times m$ positions, having $p \times m$ modulating slots, for each position. Rather, it contains only $(2p-1) \times (2m-1)$ positions, and is cyclic.

BRIEF DESCRIPTION OF THE DRAWINGS

In the drawings:

FIG. 1 shows diagrammatically a system embodying the invention;

FIG. 2 shows one of the modulating masks of FIG. 1;

FIG. 3 shows one of the framing masks;

FIG. 4 is an explanatory diagram;

DESCRIPTION OF THE PREFERRED EMBODIMENTS

Figure 5:
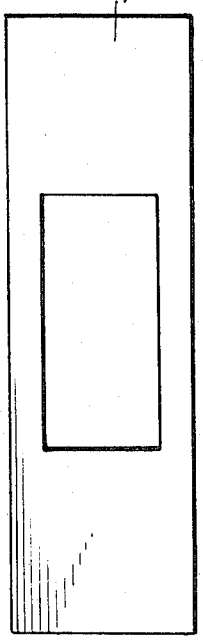
FIG. 5 shows a different type of demodulating mask.

Referring to FIG. 1, the object 2 is projected by an imaging system 4 on a modulating mask 6 in front of which rests a framing mask 8. Mask 6 is moved both horizontally and vertically by motors 10. The modulated image then enters a dispersion instrument 38, such as a diffraction grating, from which it is passed through a similar modulating mask 14 with a framing mask 16 (mask 14 being moved by motors 18 and 20) an imaging system 22, a detector 24 and a signal processor and storage 26.

Referring to FIG. 2, showing one of the modulating masks, this mask has an array of 11 × 5 spaces, which are either opaque or translucent. The squares of this array have been given numbers between 1 and 18, and those numbered 1, 5, 8, 9, 11, 13, 14, 15, 17 and 18 are opaque, while the remaining are translucent. This is indicated in FIG. 2 by encircling the numbers of those squares which are opaque. The framing mask 8 has an opening 9 therein of a size 3 × 6, and is large enough to cover all the remaining areas in any position of the opening in which it exposes a 3 × 6 group of the areas.

Of course it is understood that this numbering of the areas (in FIG. 2) is only for purposes of explanation. Likewise, the possible number of squares in any array is almost unlimited. It will be seen that, as this modulating mask 6 is moved across the framing mask 8, both horizontally and vertically, it will in any position expose 18 of the areas (6 × 3) and that the relative arrangement of the areas will be different in each position of the mask.

In operation, the modulating mask 6 is moved cyclically by motors 10, 12 horizontally and vertically so as to expose successively each 6 × 3 group of the modulating mask. In this way, relatively small portions throughout the area to be imaged are passed to the dispersion instrument, where they are separated spectrally. The spectral images pass through the second modulating mask 14, which may be identical with the first modulating mask, but not necessarily with the same distribution of opaque spaces or even the same values of $m$ and $n$. The modulating mask 14, which has a somewhat wider opening than mask 6, is moved through its cycle for each of the positions of modulating mask 6, so as in effect to scan each image emitted by the dispersion instrument 38. The images issuing from the exit mask 14 are then detected and recorded as by a signal processor such as a computer. This computer operates on the readings to reconstruct the spectrum for readout as a series of energy values versus wave length bands of the spectrum separately for each spatial element of the viewed object. The result amounts to a series of pictures, each one as seen in a different spectral wave length.

It has been stated above that, because of the nature of the device, the n spectral resolution elements do not entirely overlap in wave length, but the overlap can be made complete through any given spectral range, by suitable choice of $n$. The spectrum of the first and the $n^{th}$ slots is shown in FIG. 4, for a fictitious source of radiation, from which it will be seen that the spectral coverage for radiation entering the instrument through different slots, 1 and $p$, at the spectrometer entrance, does not show complete overlap.

If it is desirable to reconstruct the image, this can be achieved by means of diffuse light passed through a mask precisely similar to the one used at the entrance of the system. This could be used either in conjunction with a set of color filters, or with a lamp whose color can be changed. The brightness of the light is modulated so that it changes for each mask position and color. If projected in rapid enough succession, the appearance of the projected picture would then be properly colored. A television type of system could be established, based on this technique.

It is also possible to use only the cyclic two-dimensional mask modulator in conjunction with an interferometric instrument, such as a Michelson interferometer, in order to produce spatial modulation. The interferometric device would then produce the spectral modulation, and again an entire image with spectral characteristics would result through the use of one detector only.

Devices using one detector often have great practical advantages over multiple instruments. This is true both because the noise to be dealt with comes only from one detector, instead of many, and because the construction becomes less complex or expensive. An instrument according to the invention, using only one detector, can produce complete imaging as well as spectral information. There are many situations in which signal-to-noise improvements of many orders of magnitude are possible with such a system, because the amount of information processed is very great, for a fixed detector noise. Photon noise limited detectors still permit large optical throughput advantages as discussed by Mertz, 1965 (supra).

Instead of the input modulating and framing mask shown, it is also possible to use the arrangement shown in FIGS. 1 to 5 of Gottlieb, 1968 (supra).

Figure 6:
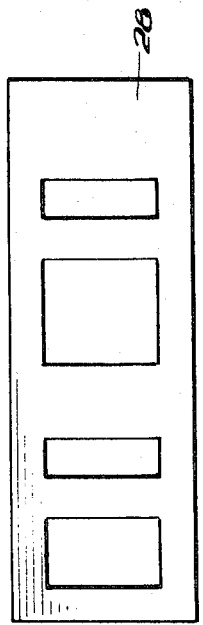
FIG. 6 shows a framing mask for the demodulating mask of FIG. 5.

It is also possible, as shown in FIG. 5, to use a simplified modulating mask 28 at the output of the dispersion instrument, this mask having merely vertical slits distributed in a pattern such as that shown in FIG. 2 of Decker, 1970 (supra). This mask moves only horizontally. The cooperating framing mask 30 is shown in FIG. 6, and remains stationary. However, this system does not give as much information about polarization as that of FIG. 1.

Figure 7:
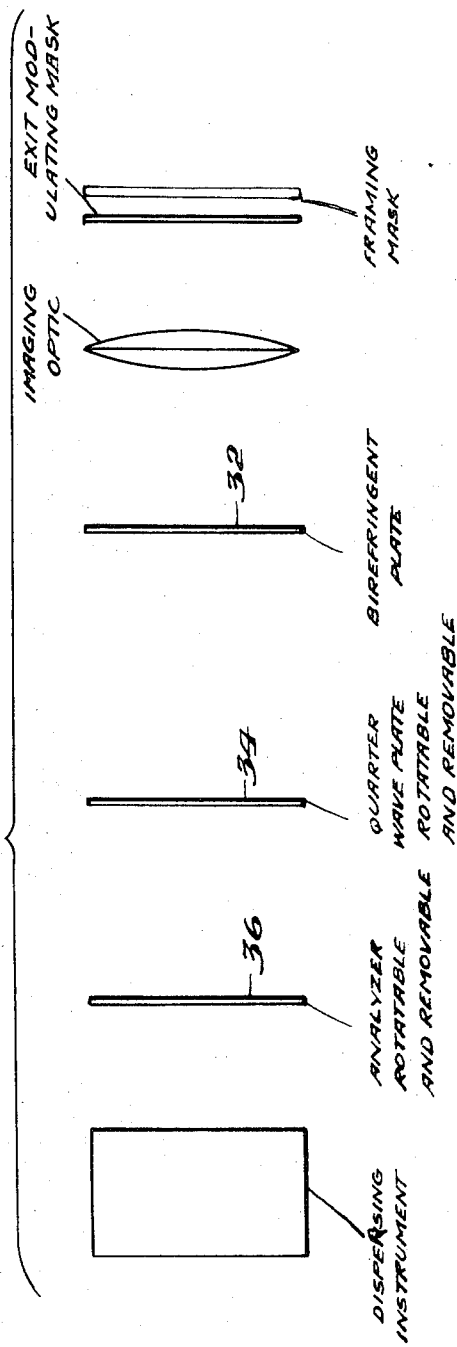
FIG. 7 shows a further modification of a part of the system.

Through the additional use of a quarter wave plate 32, birefringent crystal 34 and analyzer 36, as shown in FIG. 7, installed as part of the dispersion instrument 38, or contiguous to it, the device can be used to provide a polarization analysis, both as to type of polarization and degree, in every spatial and spectral element. These three optical components can be inserted into the optical light path, or removed from it, individually, in pairs, or collectively, and can be rotated about the optical axis of the instrument, in the standard fashion [c.f. Jenkins and White "Physical Optics"] used for polarization analysis. The birefringent plate or crystal can be used to deflect radiation with different linear polarizations, through different portions of the second modulating mask. The deflection takes place in a vertical direction, that is, perpendicular to the direction of dispersion in the spectrometer. Since polarization is specified by four parameters, the total number of measurements needed to obtain a complete polarization analysis is increased by at least a factor of four over that needed to obtain only the simple spectral and pictorial analysis, without the polarization analysis.

I claim:

1. Apparatus for sequential production of a series of signals which series represents the value of electromagnetic radiation energy levels distributed over an area comprising means for imaging the area, means for sensing the energy of the imaged area to produce electrical signals in response to radiation incident thereupon, optical means between the imaging means and the sensing means for selectively transmitting energy from portions of the area to the sensing means including a first modulating mask with an array of a plurality of rows of at least two spaces in each and a total of at least $(2p-1)(2m-1)$ spaces where $p$ and $m$ are integers of substantial value such that the product $p \times m$ can represent the desired number of areal elements required for a predetermined accuracy of spatial resolution, means to expose a succession of rectangular groups, each group comprising $p \times m$ of such spaces, approximately one-half of said spaces of said mask being opaque, and the remaining spaces non-opaque, the opaque spaces being so located that in each exposed rectangular group there is a different pattern of such opaque spaces, said exposure means exposing successively and cyclically each of such rectangular groups of spaces, so that successive groups transmit energy from different combinations of portions of the whole area to the sensing means to cause the sensing means to produce a series of different electrical signals in accordance with the modulating effect of said mask, said signals representing the energy distribution over the area, and said optical means including means for spectrally analyzing the images transmitted by the non-opaque spaces.

2. Apparatus as claimed in claim 1, in which the first modulating mask has $2m-1$ rows of $2p-1$ spaces in each and said first exposure means exposes $m \times p$ of such spaces.

3. Apparatus as claimed in claim 1 including storage connected to the sensing means.

4. Apparatus as claimed in claim 1, having, following said first modulating mask and preceding said sensing means, means for analyzing for polarization of energy.

5. Apparatus as claimed in claim 1 wherein said means to expose said group comprises a framing mask for said first modulating mask and means for producing relative cyclical movement in two dimensions between said modulating mask and framing mask.

6. Apparatus as claimed in claim 5 having on the other side of said spectral analyzing means from said first modulating mask, a second modulating mask arranged in the same relative position and a second framing mask therefor, and means for producing relative cyclical movement between the second modulating mask and the second framing mask to scan each image from the first modulating mask and first framing mask, said second modulating mask having at least one row of spaces therein approximately one half of which are opaque and the remaining spaces non-opaque and said opaque spaces being so located that said second framing mask exposes in each position relative to the second framing mask a different pattern of opaque and non-opaque spaces.

7. Apparatus as claimed in claim 6, having means for analyzing for polarization which includes a polarization analyzer, a quarter-wave plate and a birefringent plate, said birefringent plate being placed between the first and second modulating masks, said analyzer and quarterwave plate being turnable about the optical axis of the apparatus said birefringent plate, quarter-wave plate and polarization analyzer being removable from the light path singly or in combinations, said second modulating mask having an array of a plurality of rows of at least two spaces, and generally being approximately equal to the number m of rows of the first mask.

8. Apparatus for sequential production of a series of signals which series represents the value of electromagnetic radiation energy levels distributed over an area comprising means for imaging the area, energy sensing means for producing electrical signals in response to radiant energy incident thereupon, optical means between the imaging means and the sensing means for selectively transmitting energy from portions of the area to the sensing means including a first modulating mask with an array of a plurality of rows of at least two spaces in each, and a total of at least $(2p-1)(2m-1)$ spaces where $p$ and $m$ are integers of substantial value such that the product $p \times m$ can represent the desired number of areal elements required for a predetermined accuracy of spatial resolution, means movable to expose a succession of rectangular groups, each group comprising a number of such spaces less than the total number thereof, approximately one-half of said spaces of said mask being opaque and the remaining spaces non-opaque, the opaque spaces being so located that in each exposed rectangular group there is a different pattern of such opaque spaces, said exposure means exposing successively and cyclically each of such rectangular groups of spaces, so that successive groups transmit energy from different combinations of portions of the whole area to the sensing means to cause the sensing means to produce a series of different electrical signals in accordance with the modulating effect of said mask, said signals representing the energy distribution over the area, said optical means including means for spectrally analyzing the images transmitted by the non-opaque spaces, said apparatus having on the other side of said spectral analyzing means from said first modulating mask, a second modulating mask, said second modulating mask having at least one row of spaces therein, approximately one half of such spaces of said second mask being opaque and the remaining spaces non-opaque, movable means associated with said second modulating mask to expose a succession of groups each of $n$ spaces of the second mask where $n$ is an integer of substantial value representing the desired number of spectral elements required for a predetermined degree of spectral resolution and there being at least $2n-1$ of such spaces in said second modulating mask, the opaque spaces of the second modulating mask being so located that in each exposed group there is a different pattern of such opaque and non-opaque spaces, means for producing said succession of exposures of the second modulating mask in each position of the first modulating mask to scan the image modulated by the modulating mask, said sensing means comprising a single detector for receiving the images from said second modulating mask.

9. In an optical device for modulating radiation such as light from an extended object and sensing the energy in such a way as to obtain a series of signals from which both spatial resolution of different parts of the object and spectral resolution of the light coming from each part can be obtained, the device including a modulating mask, said mask having predetermined opaque and non-opaque spaces and combined with means to move it through a series of positions to produce radiations conforming thereto, spectral analyzing means for analyzing the radiation modulated by said mask and a single detector responsive to detect the radiation passing from said analyzing means thereby to produce said series of signals, the improvement wherein said mask comprises a two dimensional pattern of opaque and non-opaque spaces, and means to expose sequentially a set of groups of said spaces, an individual group comprising opaque and non-opaque spaces distributed in both dimensions, said pattern and said means exposing a set of groups cooperatively related to deliver, to said detector, radiation modulated in accordance with a cyclic code, whereby, because radiation modulated by said mask and passing from said analyzing means in a given order can retain the effects of both, the signal output of said detector can contain in retrievable form spatial information represented by said two dimensional modulation as well as spectral information represented by the effects of said analyzing means, thereby enabling spatial resolution of light from said object in two dimensions with corresponding spectral resolution.

10. The optical device according to claim 9 wherein said analyzing means comprises a dispersion instrument and a second modulating mask receiving dispersed light from said dispersion instrument and a focusing means receives radiation from said second mask and directs it upon said single detector.

11. The optical device according to claim 10 wherein said second mask comprises a two dimensional pattern of opaque and non-opaque spaces, and means to expose sequentially a set of groups of said spaces, an individual group comprising opaque and non-opaque spaces distributed in both dimensions, said pattern and said means exposing a set of groups cooperatively related to deliver to said analyzing means radiation modulated in accordance with a cyclic code.

12. The optical device according to claim 11 wherein said means to expose said set of groups of spaces of said second mask is constructed to expose said set during exposure of each of said groups of said entrance mask.

13. The optical device according to claim 9 having, following said first modulating mask and preceding said sensing means, means for analyzing for polarization of energy.

* * * * *